(12) United States Patent
Benezeth

(10) Patent No.: US 6,567,539 B1
(45) Date of Patent: May 20, 2003

(54) METHOD FOR PRODUCING AN IMAGE USING A PORTABLE OBJECT

(75) Inventor: Philippe Benezeth, Bezons (FR)

(73) Assignee: Bull CP8, Louveciennes (FR)

( * ) Notice: Subject to any disclaimer, the term of this patent is extended or adjusted under 35 U.S.C. 154(b) by 0 days.

(21) Appl. No.: 09/402,791

(22) PCT Filed: Feb. 11, 1999

(86) PCT No.: PCT/FR99/00311

§ 371 (c)(1),
(2), (4) Date: Oct. 12, 1999

(87) PCT Pub. No.: WO99/41709

PCT Pub. Date: Aug. 19, 1999

(30) Foreign Application Priority Data

Feb. 12, 1998 (FR) .............................. 98 01702

(51) Int. Cl.⁷ ................................. G06K 9/00
(52) U.S. Cl. ......................... 382/124; 356/71
(58) Field of Search ................ 382/124–127, 382/117, 115; 902/3, 6; 707/6; 356/71; 340/5.53, 5.83; 235/380, 381, 382, 382.5, 462.41, 472.01

(56) References Cited

U.S. PATENT DOCUMENTS

| | | | | |
|---|---|---|---|---|
| 3,584,958 A | * | 6/1971 | Miller et al. ................... | 356/71 |
| 4,338,025 A | | 7/1982 | Engel .......................... | 356/71 |
| 4,455,083 A | * | 6/1984 | Elmes ......................... | 356/71 |
| 4,836,786 A | | 6/1989 | Wong ......................... | 344/365 |
| 4,904,853 A | | 2/1990 | Yokokawa .................. | 235/487 |
| 5,396,559 A | | 3/1995 | McGrew ....................... | 380/54 |
| 5,448,659 A | * | 9/1995 | Tsutsui et al. ................. | 385/14 |
| 5,732,148 A | * | 3/1998 | Keagy et al. ................ | 382/124 |
| 6,182,892 B1 | * | 2/2001 | Angelo et al. .............. | 235/380 |
| 6,402,039 B1 | * | 6/2002 | Freeman et al. ............. | 235/492 |

FOREIGN PATENT DOCUMENTS

| | | |
|---|---|---|
| DE | 42 01 966 A | 8/1992 |
| FR | 2 605 935 A | 5/1988 |
| WO | WO 82 02445 A | 7/1982 |
| WO | WO 85 04035 A | 9/1985 |

* cited by examiner

*Primary Examiner*—Brian Werner
(74) *Attorney, Agent, or Firm*—Miles & Stockbridge P.C.; Edward J. Kondracki

(57) ABSTRACT

The invention relates to a method for producing a predetermined image by means of a device (40) and a portable object (8), the device including data processing means, data memorizing means, and image processing means, and the portable object including data processing means, data memorizing means, a through window, and display means (17) capable of displaying an image in the window.

The method comprises:
  placing the window of the portable object before the image processing means of the device in such a way that they cooperate optically with one another;
  producing a first image in the window;
  causing a second portable object image to be displayed by the display means of the portable object; and
  obtaining the predetermined image by superpositioning the first image and the second portable object image, one over the other, to obtain the predetermined image.

6 Claims, 11 Drawing Sheets

TAB_MSQ

| NUM | MASK | | | | | | | |
|---|---|---|---|---|---|---|---|---|
| 1 | 1 | 0 | 1 | 0 | 0 | 1 | 0 | 1 |
| 2 | 1 | 1 | 0 | 0 | 1 | 1 | 0 | 0 |
| 3 | 0 | 1 | 1 | 0 | 0 | 1 | 1 | 0 |
| ⋮ | ⋮ | | | | ⋮ | | | |
| 20 | 1 | 1 | 1 | 0 | 1 | 1 | 1 | 1 | 1 |

*FIG. 4a*

| 1 | 2 | 3 | 4 | 5 | 6 | 7 | 8 |

| 1 | 2 | 3 | 4 | 5 | 6 | 7 | 8 |

| 1 | 2 | 3 | 4 | 5 | 6 | 7 | 8 |

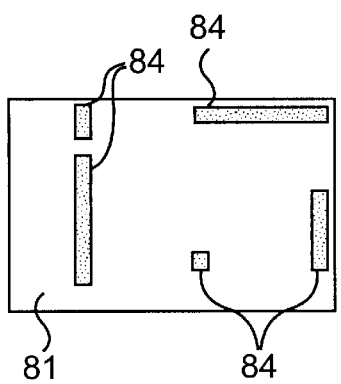
FIG. 8a
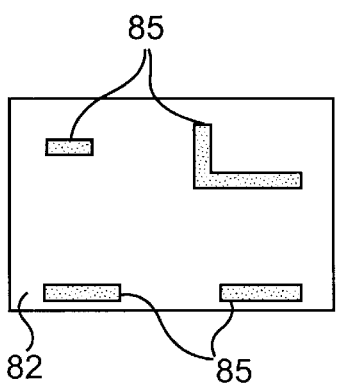
FIG. 8b
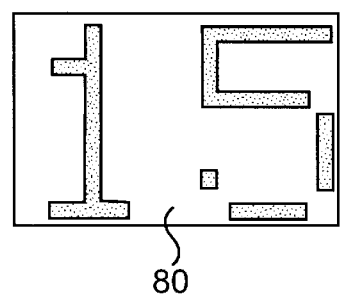
FIG. 8c
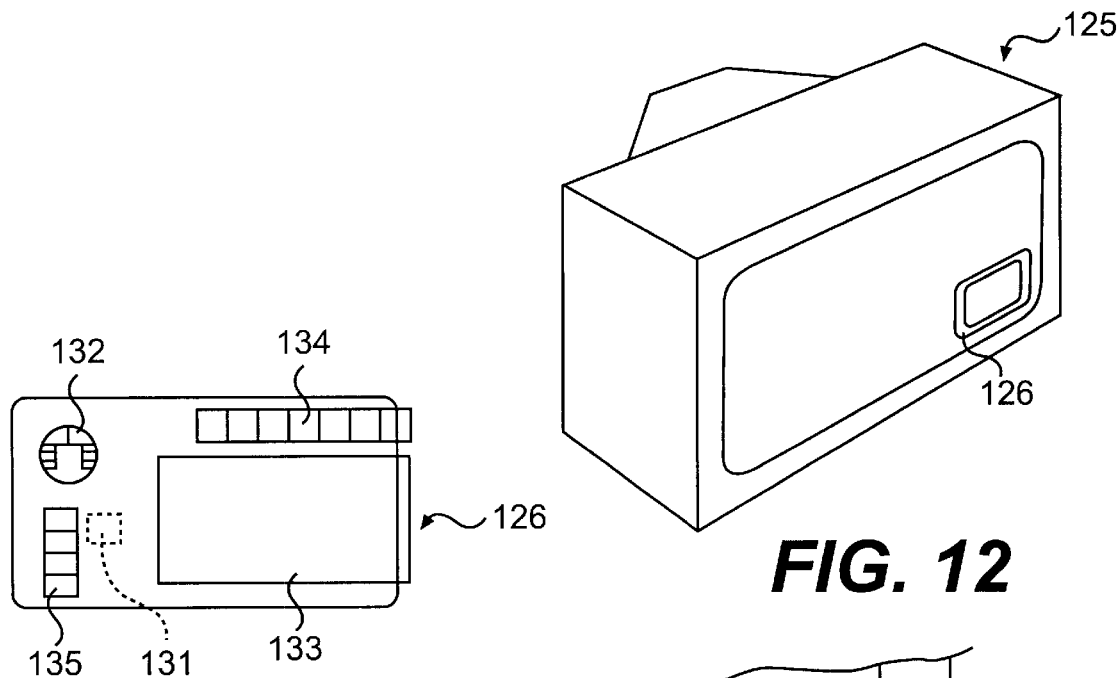
FIG. 12
FIG. 13
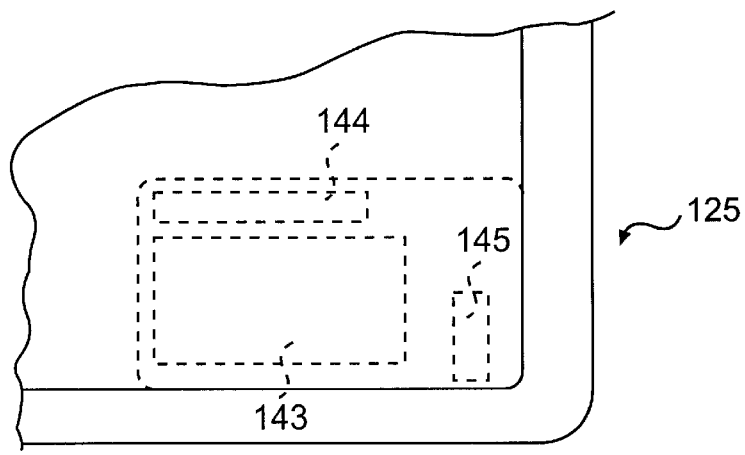
FIG. 14

TAB_MSQ_a

| NUM | MASK 1 | MASK 2 | MASK 3 |
|---|---|---|---|
| 1 | 0 1 0 0 1 0 0 1 | 0 0 1 0 0 1 0 0 | 1 0 0 1 0 0 1 0 |
| 2 | 0 1 0 0 0 1 1 0 | 0 0 1 0 1 0 0 0 | 1 0 0 1 0 0 0 1 |
| 3 | 0 0 1 1 0 0 0 1 | 0 1 0 0 0 1 0 0 | 1 0 0 0 1 0 1 0 |
| . | . | . | . |
| . | . | . | . |
| . | . | . | . |
| x | | | |

FIG. 10a

TAB_MSQ_b

| NUM | MASK 1 | MASK 2 | MASK 3 |
|---|---|---|---|
| 1 | 0 1 0 0 0 0 0 0 | 0 0 0 1 0 0 0 0 | 0 0 0 0 0 0 1 0 |
| 2 | 0 0 1 0 0 0 0 0 | 0 0 0 0 1 0 0 0 | 0 0 0 0 0 0 0 1 |
| . | . | . | . |
| . | . | . | . |
| . | . | . | . |
| y | | | |

FIG. 10b

TAB_MSQ_c

| NUM | MASK 1 | MASK 2 | MASK 3 |
|---|---|---|---|
| 1 | 1 1 0 0 1 1 0 0 | 0 1 1 0 0 1 1 0 | 0 0 1 1 0 0 1 1 |
| 2 | 1 0 1 0 1 1 0 0 | 0 1 0 1 0 1 1 0 | 0 0 1 1 0 1 0 1 |
| . | . | . | . |
| . | . | . | . |
| . | . | . | . |
| z | | | |

FIG. 10c

METHOD FOR PRODUCING AN IMAGE USING A PORTABLE OBJECT

BACKGROUND OF THE INVENTION

1. Field of the Invention

In the field of transporting and processing information processing data, several mechanisms must be taken into account in order to guarantee security: authentication of individuals and of data, and enciphering and deciphering confidential data. For a certain number of years, microcircuit cards, commonly called chip cards or smart cards, have been used to implement these mechanisms. These cards are provided with a microprocessor which, in accordance with a program contained in ROM, controls the access to the information stored in a programmable memory.

2. Description of the Invention

The chip card is a portable object that can be issued to an individual or a group of individuals. To gain access to the information memorized in the memory of the microcircuit, the user or users of the card must necessarily be authenticated. To do so, a first method comprises asking the user to type in a holder code (or "PIN", for Personal Identification Number) on a key board, and transmitting this code to the microcircuit on the card. The card compares it with a reference code, and if they are the same, the user is authorized to access the information on the card. Because there are so many applications using microcircuit cards, there are manifold holder codes. The users often have difficulty remembering several such codes. One solution is to identify the users using a biometric impression, or print. This impression may be of the fingerprint, the retina, or the particular form of a signature. Hence users no longer have to remember their holder code; they present their finger or subject their eye to analysis by a camera, or they write their signature manually on a touch-sensitive display.

This solution has one disadvantage in terms of security. The print or impression, whatever its nature, is perceived by an appliance, and the signals are communicated to the card by an electrical connection. A criminal can put a bug on this connection and thus record the characteristic signals of the print of an individual. Having done so, he can reproduce these signals and pass as that individual. The problem is due to the fact that a biometric print is immutable and its value remains fixed. Conversely, holder codes can be changed when they are memorized in the programmable memory of a card, but as has just been explained, this solution has other major disadvantageous.

Another way of proceeding is to integrate the print pickup directly in the circuit of the card. A major manufacturer of integrated circuits has recently put a circuit on the market that is capable of acquiring a digital print by means of micropickups for pressure and of processing the information by extracting a datum that is characteristic of the print from it. But acquiring the furrows in, a fingerprint is done on a large surface area, on the order of a square centimeter; thus the pickup must be at least as long as one centimeter. Such a size is an obstacle to embedding such a circuit in a card, because a chip card is necessarily subjected to pronounced bending.

BRIEF SUMMARY OF THE INVENTION

A first object of the present invention is to be capable of performing biometric print recognition, preventing fraud and the mechanical problems described above.

A second object of the invention is to provide a print acquisition surface which is personal to the card holder, in such a way that on an associated print acquisition appliance, no trace whatever capable of being detected remains.

A third object of the invention is to furnish means for transmitting an image to a screen that is properly visible only to one or more specific observers who hold the above defined rights.

A fourth object of the invention is to furnish identification means associated with an image projected on a screen by defining an identifier of a person who is authorized to see that image, or a portable object held by that person and by means of which the image is projected.

To this end, the invention relates to a method for producing a predetermined image by means of a device and a portable object, the device including data processing means, data memorizing means, and image processing means, and the portable object including data processing means, data memorizing means, a through window, and display means capable of displaying an image in the window, characterized in that it includes the steps comprising:

placing said window of the portable object before the image processing means of the device in such a way that they cooperate optically with one another;

producing a first image in said window;

causing a second portable object image to be displayed by the display means of the portable object; and obtaining said predetermined image by superposition of the first image and the second portable object image.

BRIEF DESCRIPTION OF THE DRAWINGS

Further details and advantages of the present invention will become apparent in the course of the ensuing description of several preferred but not limiting embodiments, in conjunction with the accompanying drawings, in which:

FIG. 4a is a table of masks that is used in a procedure of authenticating a fingerprint;

FIGS. 8a–8c illustrate one way of decomposing an image into two partial images;

FIGS. 10a–10c show three more tables of masks that are used in a fingerprint authentication procedure;

FIG. 12 shows a screen that cooperates according to the invention with a card, in a procedure of reconstituting a decomposed image;

FIGS. 13 and 14 respectively illustrate the card and a detail of the screen of FIG. 12;

DETAILED DESCRIPTION OF THE INVENTION

Figure 1:
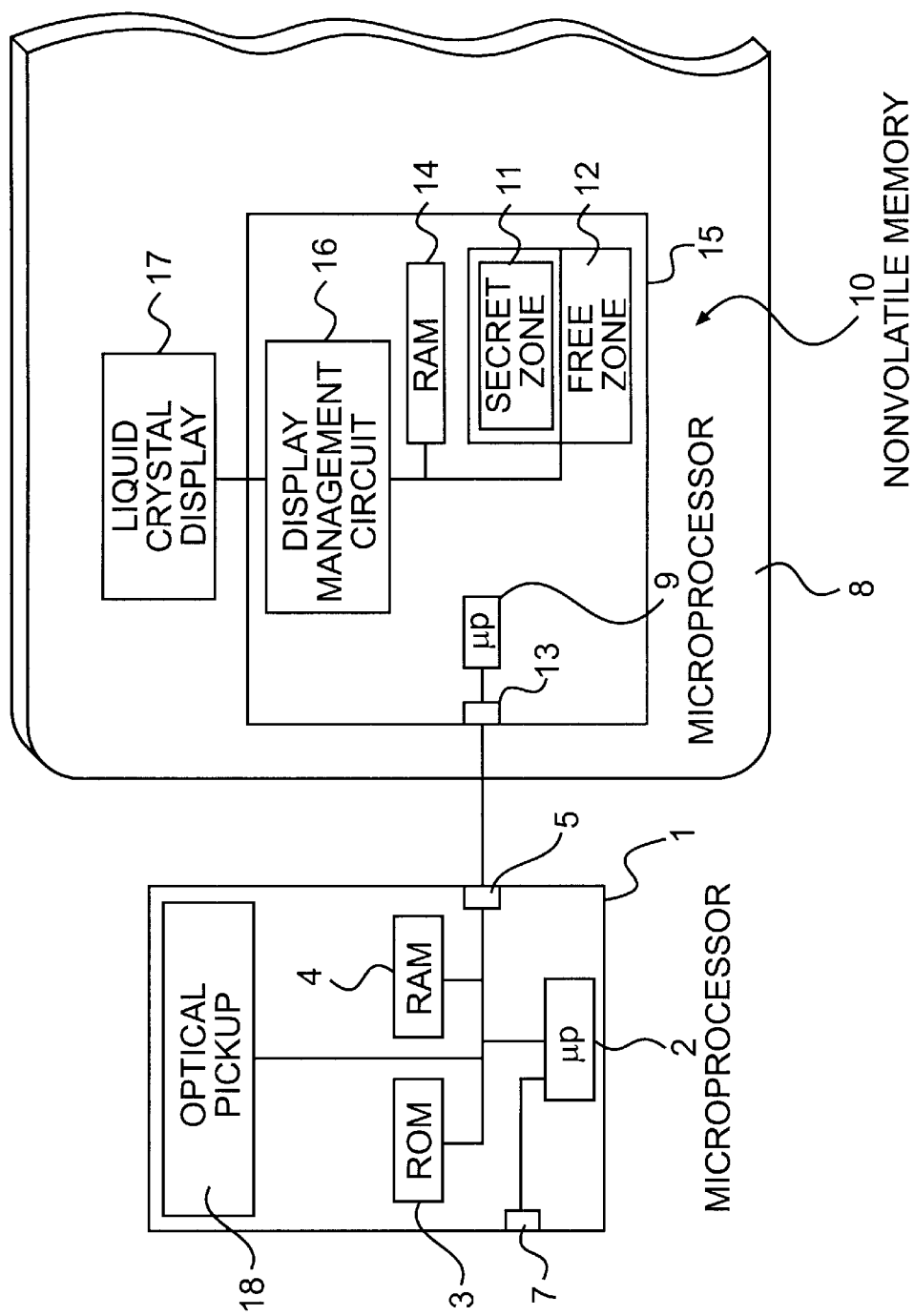
FIG. 1 shows the basic layout of a chip card according to the invention, which cooperates with a data processing device.

The data processing device 1 shown in FIG. 1 includes, in a manner known per se, a microprocessor 2, to which a read-only memory (ROM) 3 and a random-access memory (RAM) 4, means 5 for cooperating with or without physical contact with a chip card 8, and a transmission interface 7 enabling the data processing device to communicate with another similar device, either directly or through a communications network. An optical pickup 18 for acquiring a fingerprint is also connected to the microprocessor 2.

The device 1 can furthermore be equipped with storage means, such as diskettes or disks that may or may not be removable, acquisition means (such as a keyboard and/or a pointer device of the mouse type), and display means, but these various means have not been shown in FIG. 1.

The data processing device can comprise any information processing equipment installed at a private or public location and capable of providing information management means or furnishing various goods or services, this equipment being installed either permanently or in portable fashion. In particular, it can also be a telecommunications apparatus.

Furthermore, the card 8 has a chip 15, which includes data processing means 9, a non-volatile memory 10, a volatile working memory or ram 14, and means 13 for cooperating with the data processing device. This chip is arranged so that in the memory 10, it defines one secret zone 11, in which the information, once recorded, is inaccessible from outside the chip but is accessible solely to the processing means 9, and a free zone 12, which is accessible from outside the chip for reading and/or writing information. Each zone of the non-volatile memory 10 can include a non-modifiable ROM portion and a modifiable EPROM or EEPROM portion, or may be made up of RAM memory of the "flash" type, that is, having the characteristics of a EEPROM but with access times identical to those of a conventional RAM.

The chip 15 also includes a display management circuit 16 connected to the processing means 9 and intended to command an image display 17 external to the chip 15 but also located on the card 8. The display management circuit 16 receives data in parallel that arrive from the processing means 9, such as ASCII characters, and displays these data by controlling pixels that make up the display. The display is in particular a liquid crystal display, but in a variant this may be replaced with any other display capable of displaying an image as a function of electrical signals.

For the chip 15, a microprocessor with non-volatile, autoprogrammable memory can be used in particular, such as that described in U.S. Pat. No. 4,382,279 in the name of the present applicant. As indicated in column 1, lines 13–25 of this patent, the autoprogrammable nature of the memory means the capability of a program fi, located in this memory, to modify some other program fj, also located in this memory, so as to produce a program gj. One example of such a circuit which is capable of directly managing a liquid crystal display is manufactured by Samsung under catalog number KF56C220 (equipped with a ROM) or in the series KS56 (with a EEPROM) or manufactured by NEC under catalog number µPD78.

In a variant, the microprocessor of the chip 15 is replaced—or at least supplemented—by logic circuits implanted in a semiconductor chip. Such circuits are in effect capable of performing calculations, in particular authentication and signature calculations, thanks to the cabled, not microprogrammed electronics. In particular, they may be of the ASIC (application specific integrated circuit) type. By way of example, Siemens component catalog number SLE 4436 and SGS-Thompson component ST 1335 can be mentioned.

Advantageously, the chip is designed monolithically. In a variant, the display management circuit 16 is on a different chip from another chip that contains the processing means 9 and the memories 10, 14.

A card equipped with a liquid crystal display is known per se. European Patent EP-A 0167 044 shows a portable object of the credit card type, equipped with a central unit, memorizing means, input/output means in the form of electrical contact pads, a keypad, solar cells for power supply, and a liquid crystal display. The object is used as a payment means, as a calculator, and as an electronic schedule-keeper. The liquid crystal display displays alpha-numeric characters, consisting of data input by the keypad or results of calculations performed by the card.

A liquid crystal display has quite valuable properties: It is very flat and can thus be placed in a chip card. The principle of such a display, it will be recalled, resides in the capability of certain liquids to pass from a "transparent" state to an "opaque" state when they are subjected to electrical voltage. Once this happens, they become polarized and either obstruct the light or not, depending on whether a voltage is applied or not. They do not emit light themselves but use ambient light instead; thus a liquid crystal display consumes very little energy, which is also quite useful for a chip card, because by using the energy from a battery or coils, the display can work even when the card is not connected electrically to the data processing device 1.

For displaying alphanumeric characters or some kind of image, a liquid crystal display is made up of a matrix of points, known as pixels, that are individually controlled electrically. For example, the matrix may be, made up of seven rows and five columns, thus defining 35 pixels. Most standard characters (codes under the ASCII standard) can be displayed with the aid of such a matrix. The display has a background that reflects the rays of light, except to areas where pixels, having been subjected to voltage, are opaque and appear black. It will be seen hereinafter that a simplified screen with eight individually addressable bands can be used.

Figure 2:
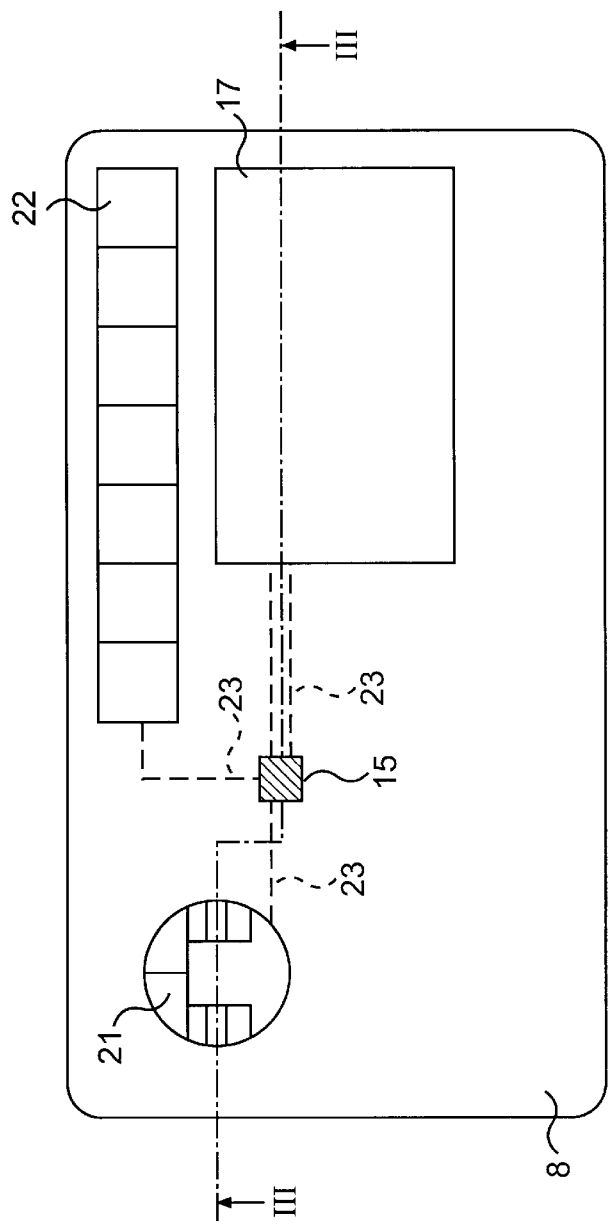
FIG. 2 is a plan view of the chip card of FIG. 1, showing its practical makeup.

Turning to the invention, FIG. 2 shows the arrangement of the various components of the card on it. The chip 15 is located in a central region of the card and is connected to the display 17, to several electrical contact pads 21 intended for cooperation with the data processing device 1, if that mode of communication is selected, and optionally to a strip of solar cells 22, in the case where this way of supplying power to the card is selected. Connection wires are shown at 23.

In a first embodiment, the display must have at least the same size as a window for acquiring a digital fingerprint, which is accordingly approximately 1 to 1.5 cm. Such dimensions are made possible by the fact that, unlike an electronic chip, a liquid crystal display is relatively flexible, so that it will be little affected if the card is subjected to bending. Any image that forms on the display is made up of transparent or opaque pixels; the opaque pixels then appear in the color black. The pixels can be addressed individually by the chip. They can take any form: points, bands, or areas of arbitrary dimension. Other uses of such a card may require larger sizes, for instance for displaying a text. It will be seen hereinafter that the display produces a partial image. The precision of this image depends directly on the size of a pixel. Each pixel can be activated independently of the others, which among other effects also makes it possible to use graphics.

Figure 3:
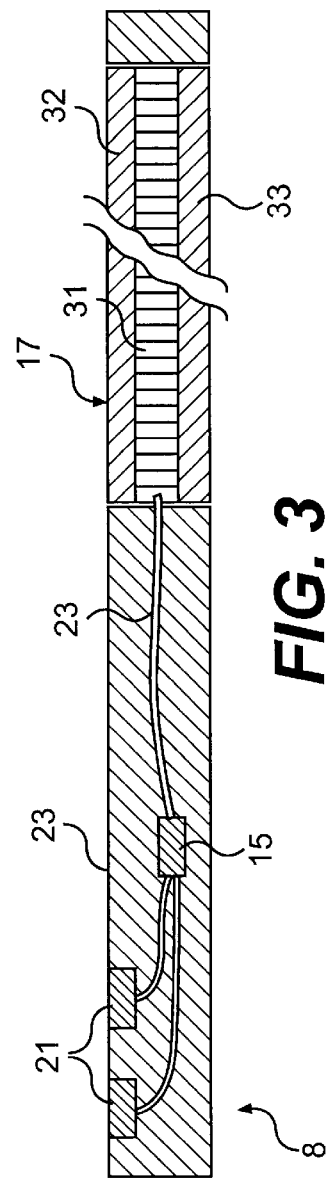
FIG. 3 is a sectional view of the card, taken along the line III—III of FIG. 2.

A section through the card in the first embodiment of the invention is shown in FIG. 3. Contacts 21, the chip 15, and the display 17 can be seen here, connected to one another by the connecting wires 23. The display 17 extends through the entire thickness of the card and includes at least three layers 31 through 33. An inner active layer 31 constitutes the display per se and is formed of a material that contains liquid crystals; it is divided into as many "liquid crystal pockets" as the display includes pixels. In an important feature of the invention, two outer layers 32, 33 confine the active layer 31 and are of a transparent material, such as plastic; together, they make up a window extending all the way through the card.

Figure 4:
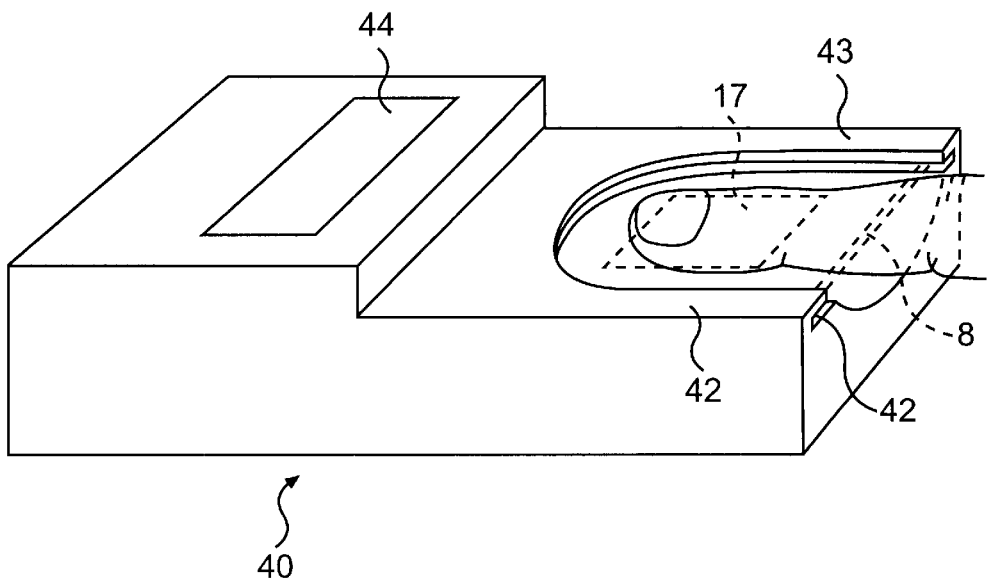
FIG. 4 is a perspective view of a reader intended to cooperate with the card of FIG. 2.

Now that the card has been described, we will show a first use thereof for authenticating its holder, in conjunction with FIG. 4.

The card is inserted into a card reader 40, which corresponds to the data processing device 1 of FIG. 1 and whose transmission interface (7, FIG. 1) allows a link to a control center to be established. The card 8 is inserted into an acquisition slot 41 and is held between two rails 42, 43. The portion of the card that remains visible contains the transparent liquid crystal display 17. In this position, the liquid crystal display is located just above the pickup, such that a window for acquiring the impression or print, which is part of the pickup, coincides with all or part of the display. For acquiring the print, it is important that the card always occupy the same position in the reader. The reader advantageously includes a display screen 44.

Figure 6A:
FIGS. 6a and 6b illustrate the concept of intersection points in the fingerprint furrows.
Figure 6B:

One method for authenticating fingerprints consists of reference-marking the intersections of the grooves on a fingerprint. FIG. 6a shows a fingerprint pattern, while FIG. 6b, at the small squares 60, shows the points where the furrows of FIG. 6a intersect. Each intersection is identified as a point defined by scalar coordinates (x, y) based on a reference mark defined by the pickup. Let us assume that a finger has a print that includes K intersecting points; hence the characteristic of this fingerprint is the set of K points of coordinates $(x_i, y_i)$, with i varying from 1 to K. For the sake of independence from the particular nature of the pickup, the k points are memorized by their relative addresses. One of them is then selected as the origin; its coordinates are accordingly (0, 0). The coordinates of the other points are determined as a function of it. By convention, this point selected as the origin may be the lowest one on the left of the print.

Authenticating the card holder assumes a prior phase of personalizing the card, in which the relative coordinates of an authentic holder and pertaining to a reference print are memorized in the card. After that, for each of the authentication procedures that occur, the relative coordinates of the holder to be authenticated, whose print will be sampled by the pickup of the reader 40, will be compared with those memorized in the card. This comparison is made taking into account first of all the origin of the points issuing from the reference print and the origin of the points issuing from the print to be authenticated. Next, it is verified whether the other points of the print to be authenticated, which are recognized by the reader, can correspond to those of the reference print. When the comparison procedure is completed, the card counts a number of authentic points corresponding to the common points in the reference print and the print to be authenticated. If this number is higher than a certain value, the card considers the print to be authenticated as being authentic.

A fingerprint can contain tens of intersecting points, on average about 30. The card memory must have the maximum coordinates of these points. When a print is being identified, there is no need to verify the existence of all these points; it suffices to verify the relative coordinates of some, such as 10, of them. That is to say, it is allowable to mask two-thirds of the print. The mathematical reasoning that follows will prove that 10 points are sufficient to make a virtually certain authentication.

Let us assume a fingerprint pickup that has a resolution of one-tenth of a millimeter and an active pickup surface area of 12×12 mm. This pickup has 14,400 individual cells or pixels. After detecting the line of the furrows, 30 intersecting points are detected. Using the method described, the liquid crystal display performs masking, for example of 75% of the total surface area, such that the number of pixels seen by the pickup is divided by four, and hence is 3600. On average, one-fourth of the intersecting points is detected, or in other words about seven of them. The one serving as an origin is not taken into account during the authentication, and so the test pertains to six points. The number of possible combinations of six points among 3599 in all is as follows:

$C3599^6=(3599)!/[(3599-6)!\times 6!]=3\times 10^{18}$, where $C$ stands for the number of combinations, and (!) is the factorial function.

If a single error in acquisition among these six points can be tolerated, the number of combinations is $C3599^5=(3599)!/[(3599-5)!\times 5!]=5.5\times 10^{15}$.

The likelihood that, in a population of 1,000,000 inhabitants, two prints will have six intersecting points at relatively identical locations is one chance in $5.5\times 10^9$. The risk of error is thus very slight, and so it can be concluded that reducing the acquisition surface area by a factor of three (as suggested above) does not significantly alter the quality of the authentication.

In a specific characteristic of the invention, the card is arranged so that the display behaves like a mask, partially masking a fingerprint image from the pickup. Thus a random modification of the mask, each time a print is acquired, makes it possible to randomize a partial print image from the pickup. As a consequence, if a possible criminal succeeds in sampling partial image data of the print from fraudulent access to the reader 40, he cannot re-use these data for the sake of later authentication, because for the later authentication the card will a priori have selected a different mask.

In the example in question, the liquid crystal display is made up of eight bands that can be addressed individually by the microprocessor 9 of the card. Each of these bands can be rendered transparent or opaque, depending on whether or not a voltage is applied. By convention, if the microprocessor transmits the value "1" to the input/output port of the display, then the corresponding a band is transparent. If the value "0" is applied, the band is made opaque. To improve the level of security, it is quite possible to choose a number of bands greater than eight.

In the secret zone 11 of its non-volatile memory 10, the card contains a mask table called "TAB_MSQ" which makes it possible to establish a correspondence between a mask selection number NUM and a mask defined by a value of eight bits. In the case illustrated in FIG. 4a, TAB_MSQ contains 20 values of eight bits each. These values represent 20 possible combinations of the state of eight bands, or in other words, 20 masks. For the first three masks, four bands out of eight are opaque, such that only half of the print image will be visible through the display. For the last mask, only one band is transparent. The value of the mask selection number NUM can be extracted from a counter or a random number generator of the card.

Figure 7A:
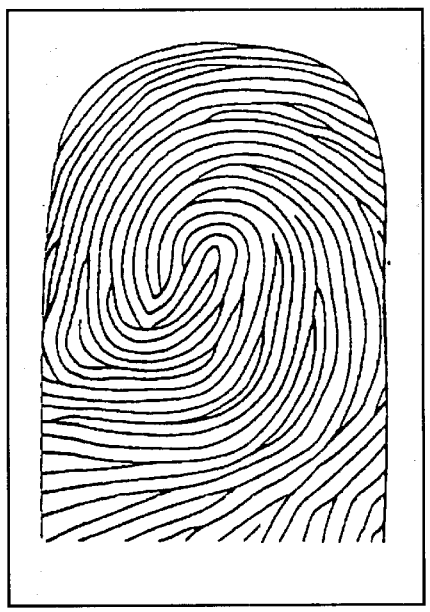
FIGS. 7a–7d illustrate a second type of mask.
Figure 7B:
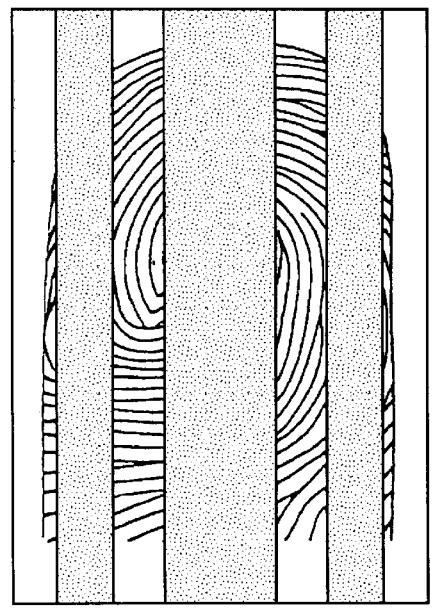
Figure 7C:
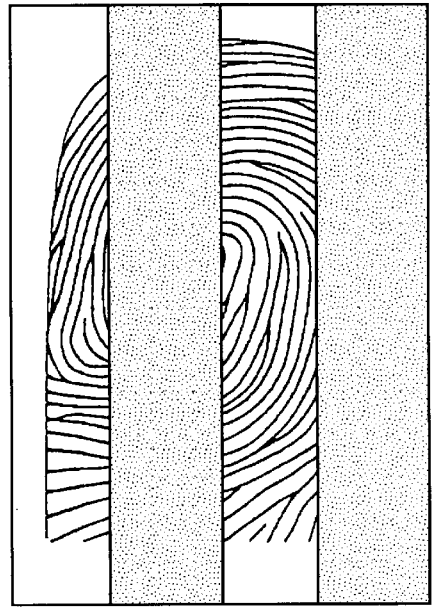
Figure 7D:
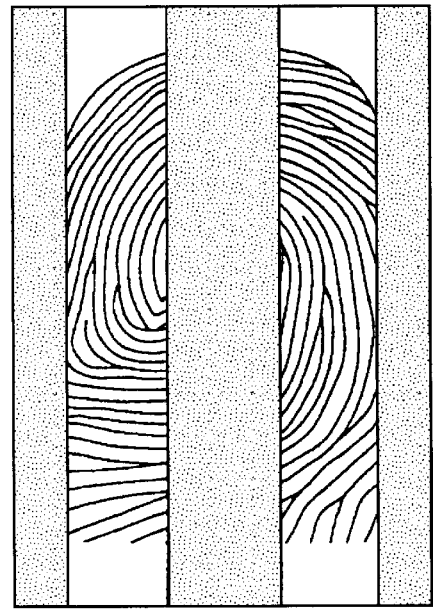

FIGS. 7a, 7b, 7c, 7d show the appearance of a fingerprint through the display of the present invention, as the pickup of the reader 40 sees it. In FIGS. 7b–7d, the eight bands of the display are reference-marked by an ordinal number 1–8. FIG. 7a shows the entire print, and the value of the mask is then "11111111". FIG. 7b shows the same print, with mask 1 as recorded in the mask table TAB_MSQ superimposed on it, the value of which mask is "10100101"; the bands 2, 4, 5 and 7 are then opaque. FIGS. 7c and 7d respectively show the partial image of the same print obtained with masks number 2 and number 3 from TAB_MSQ.

Once the card 8 slides on the bottom inside the reader 40, it is subjected to voltage by way of the contact pads 21. The reader has a biometric authentication program for managing an authentication procedure using the card. With a visual or spoken message, it asks the holder to place his finger on the liquid crystal display 17 of his card.

Figure 5:
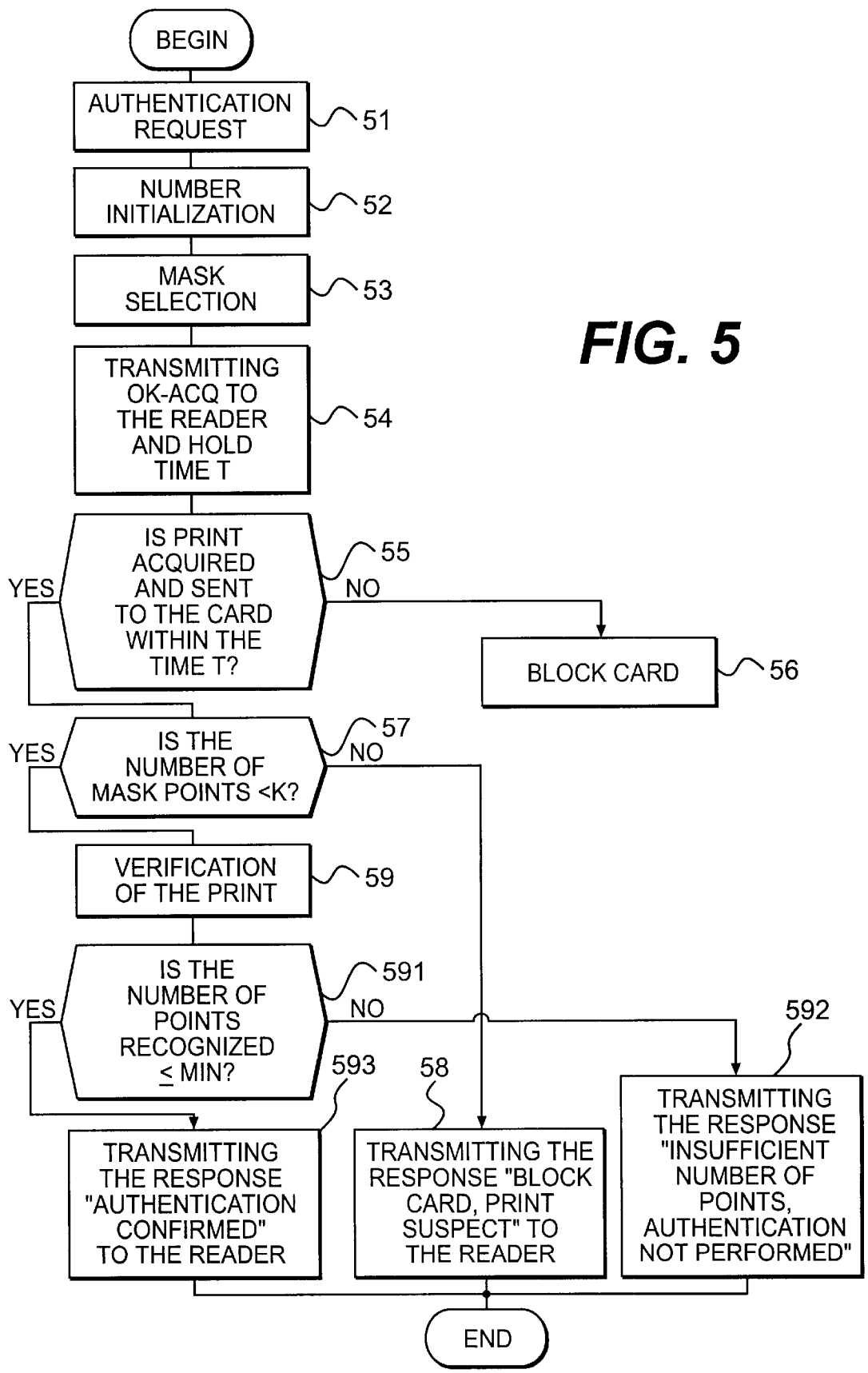
FIG. 5 is a flow chart for the fingerprint authentication procedure.
Figure 5A:
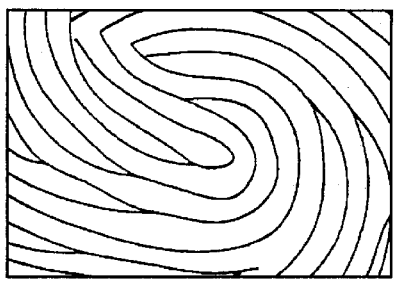
FIGS. 5a–5d show a first type of mask.
Figure 5B:
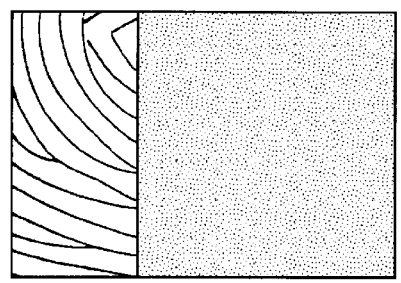
Figure 5C:
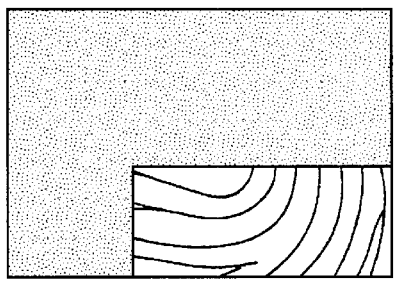
Figure 5D:
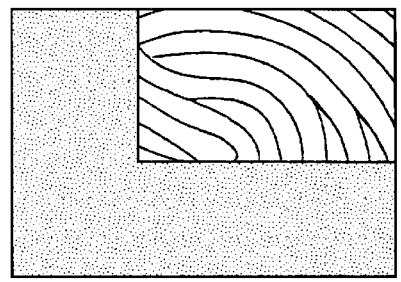

The sequence in the authentication procedure is illustrated by FIG. 5. In step 51, the reader begins the procedure by transmitting a request for authentication, by a specific command, to the card. The card initializes the value of the mask selection number NUM in step 52. In all cases, its value does not exceed 20. In step 53, the processing means of the card look in the mask table TAB_MSQ for the value of the 8-bit byte corresponding to the selected value of NUM. This 8-bit byte value is furnished to the display management circuit 16 (FIG. 1), in such a way that the corresponding mask appears on the liquid crystal display. The card then tells the reader that it can perform an acquisition of the print (step 54), by transmitting a response "OK-ACQ". On transmitting "OK-ACQ", the card initiates a hold time of duration t.

In step 55, the reader performs an acquisition of the image of a fingerprint of the card holder, placed on the pickup, through the liquid crystal display. The reader advantageously performs a first processing of the image data from the pickup. For example, using the technique of recognition of the intersecting points of the furrows, the reader calculates the position of these points. This position is defined in the form of two coordinates (x, y), the abscissa and the ordinate. These coordinates are calculated from the origin of a reference mark defined by the reader. Since the cards are always positioned in the same way in the reader, the bands of the display always occupy the same coordinates, however, each time a print is acquired, the position of the finger shifts. The coordinates of the intersecting points in the reference mark defined by the reader are no longer the same. The reader then transmits the coordinates (x, y) of the points resulting from the acquisition and from the first processing to the card. If the hold time t defined by the card has elapsed, then the card can suspect an attempt at fraud. This fact that the hold time is exceeded can indicate that a criminal is attempting to analyze the position of the opaque and transparent bands and calculating the image data to simulate an authentic print. In that case, the procedure jumps to step 56, where the card is blocked and can optionally send an error message to the reader.

If the hold time has been adhered to, the procedure moves to step 57, where the card analyzes the coordinates of the points received by the reader and verifies that they are not located within a zone masked by an opaque band of the mask. Let us assume that the pickup has a precision of 100 pixels out of 150; the values for x vary from 0 to 99, and the values for y vary from 0 to 149. Since the bands are longitudinal, the points masked by one of them are all the points for which the abscissa (x) is included between two predetermined values. The first band pertains to all the points where x is included within the range [0, 12], and the second band relates to the points where x is within the range [13, 25], and so forth. The card knows which bands have been made opaque; it can thus verify that the reader is not transmitting at points located under the opaque bands. If such points arrive, the card can suspect that fraud is being attempted, by transmitting a print-recorded in a prior authentication procedure. Another reason, however, might be that the display is defective.

To overcome certain imprecisions due to the acquisition, the blockage occurs when a number "k" of normally concealed points are recognized by the card. This number is written in a programmable zone of the non-volatile memory, for example when the card is personalized by an organization that issues it. If maximum security is wanted, even if it entails blocking cards by mistake, then k is equal to 1. Conversely, if one wants to inhibit this blockage function, k can be defined at 50, for example.

Once the number k is attained, the card is then blocked (step 58) and a message of the type "card blocked; print suspect" is sent to the reader. The card writes a blocking bit in its non-volatile memory. It can be imagined that for a bank card, for instance, the authority that is capable of unblocking it is the organization that put it into circulation.

If the number k is not attained, then it can be provided that before the print is verified, writing in the memory of the card can be done to record an access bit. The electrical and temporal characteristics of the signals relating to this writing are then selected identically to those of the blocking bit described in step 56, in such a way that a criminal cannot distinguish which of the two alternatives in step 57 was chosen by the card.

In step 59, the card then verifies the print picked up, by comparing the data transmitted by the reader to the coordinates of the reference print, which are stored in a secret, programmable zone of its non-volatile memory. This comparison is done by successive approximations. It consists of analyzing the relative positions of the points of the print, independently of the reference mark. At the end of this processing, a number "N" of points are recognized as identical. It has been described above that an authentication is effective upon the recognition of 10 points. The card in step 591 analyzes the number of points recognized, by comparing them to a minimal value MIN, which in this example is equal to 10. If this number is less than MIN, then the program jumps to step 592. The card then sends the reader the message "Insufficient number of points; authentication not performed"; the authentication is not performed, and access to any memory zone of the card, which is subject to the proper presentation of the fingerprint, is not authorized. If in return the number of points recognized as being identical is greater than or equal to MIN, then the authentication is confirmed, and a corresponding message is sent to the reader (step 593).

In a variant, the aforementioned processing of image data by the reader in order to derive from it coordinates (x, y) that can be exploited directly by the card (step 55) will be done by the card itself; in that case, the image data originating at the pickup are received directly by the card.

In the above description, it develops that the signals resulting from the acquisition of the fingerprint are a function of the mask selection number NUM calculated by the card. A criminal who will have recorded the signals in a preceding authentication operation still cannot authenticate himself, because the value of NUM evolves, in such a way that the values attained by the card evolve as well. He will be found out, the first time he attempts to commit a fraud.

The presence of the card between the finger of the user and the optical pickup has still other advantages. First, the method increases the level of security. In conventional devices where the user's finger is placed directly on the optical pickup, some trace of the fingerprint always remains on the pickup. A criminal can lift the print and possibly reproduce it. In the device of the invention, however, the finger is never in contact with the reader; thus there is no trace whatever remaining on the reader after the authentication. In addition, this arrangement can prevent the transmission of disease between users. Finally, it can prevent fouling of the pickup from dirt that may be left there by the user's finger.

In a variant, the display can have a different appearance other than the bands. FIGS. 5*a*, 5*b*, 5*c*, 5*d* show motifs corresponding to zones of arbitrary shape, such as rectangular zones. In the example illustrated by FIGS. 5*b*, 5*c*, 5*d*, three masks are defined such that each of the opaque zones corresponds to two-thirds of the total image. The three partial images defined by these masks have to be juxtaposed in order to reconstitute the complete image of the print. This characteristic is not essential, and the opaque zones can overlap.

In certain particular cases, the mask can cover the majority of the intersecting points in the furrows of the print; the risk will then be that there will not be enough intersecting points to authenticate the print correctly. A variant of the present invention comprises making a plurality of print acquisitions, with processing of a new partial image each time.

To do so, as FIG. 10*a* shows, a plurality of columns are added to the table TAB_MSQ_a. For a particular line, the values extracted from different columns represent the image data corresponding to different masks 1, 2, 3, each of which defines one partial image, such that the sum of the three-partial images will be equal to the total image. In the table TAB_MSQ_a, it can be seen that for each value, three bits out of eight have the value "1", which indicates that approximately one-third of the print image is uncovered. In all, this table contains a number x of lines, which is a function of the number of possible combinations of three bits out of eight.

Thus if it turns out that mask 1 covers a very great number of points in order to perform a significant authentication, then the processing means of the card will decide to use the complimentary mask 2, which cannot mask the points masked by mask 1. If even that is not enough, it will use mask 3. In this last case, the entire print is acquired and sent tb the card, and the points acquired are thus sent in three consecutive batches.

Figure 11:
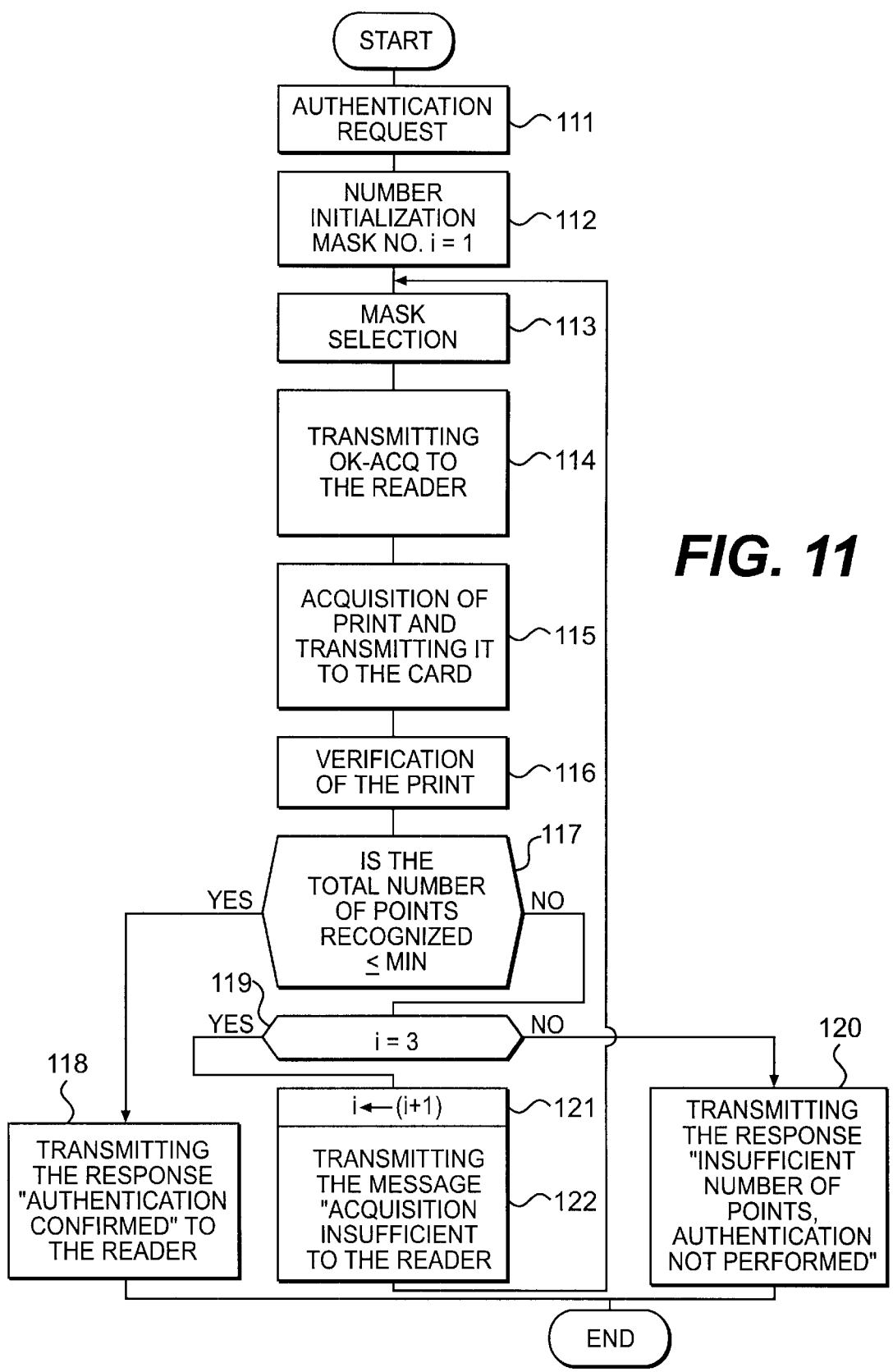
FIG. 11 is a flow chart for a fingerprint authentication procedure, using the mask tables of FIGS. 10a–10c.

FIG. 11 shows a flow chart for performing a biometric authentication using the table TAB-MASQ of FIG. 10*a*. In step 111, the reader requests fingerprint authentication of the card. The card, in step 112, sets a variable "i", which represents a mask number, to the value "1" in its working memory, and calculates the value of NUM, which determines the choice of the mask value. For example, if NUM= 1, then the mask value is 01001001.

Next come the steps already described with respect to FIG. 5 and including step 113 for mask value selection and display of the corresponding mask, step 114 for transmitting the message OK-ACK to the reader, step 115 for print acquisition and transmitting it to the card, optionally a step, not shown, of verification of the number of points masked (see step 57, FIG. 5), step 116 for verifying the print, a step 117 for comparing the number of points recognized with a minimum value min. As has already been shown above, the number of points recognized is optionally a total number of points acquired in a plurality of successive acquisitions.

If the minimum value MIN has been reached or exceeded, step 118 consists of transmitting a message, "Authentication confirmed", to the reader. If not, one moves to step 119, where it is verified that mask 3 has not yet been reached. If it has been reached, one moves to step 120, where the card sends the message "Insufficient number of points; authentication not performed" to the reader. If mask 3 has been reached, then one moves to step 121, where the mask number i is incremented by one unit, so that another available mask can be used; here, this number will be equal to 2. In the next step 122, the card sends the reader the message "Acquisition insufficient", to tell the card holder that the reader is going to perform a new acquisition. Then one returns to step 113, where the card selects a new mask, numbered i. The following steps are executed until step 117 is reached, where the card adds the new points of, the print that have been recognized to those already recognized in the previous acquisition; any points common to the acquisitions already performed are thus not taken into account more than once. The procedure then ends with step 118 or 120, as applicable.

The strategy for setting up mask values depends on the degree of security desired and on the display precision, and may also depend on the print itself, that is, on the individual in question. The three complementary masks 1–3 in table TAB_MSQ can meet perfectly, without having common zones (table TAB_MSQ_a in FIG. 10*a*). They can completely exclude certain zones that remain opaque no matter which mask is being used, as shown in FIG. 10*b*: In line 1, the bits in position 1, 3, 5, 6, 8 are at zero, regardless of the mask selected, and thus the display always shows opaque bands in the corresponding regions. This strategy can be used if the fingerprint has many intersecting points (for instance, more than 50); it is then possible and useful to reduce the number of points transmitted to the card, so as to limit the potential damage from fraudulent sampling of a very large number of points in the print. Finally, the zones of the mask can overlap solely at the edges, to eliminate any uncertainties when points situated exactly on a line where two zones intersect are detected; this is the case in FIG. 10*c*, line 1, where the bit in position 2 is common to masks 1–3, the bit in position 6 is common to masks 1 and 2, and the bit in position 7 is common to the masks 2 and 3.

One improvement in the present invention is that, the card reader 40 in FIG. 4 is provided with a retractable hatch that in a closed position hides the pickup and protects it. The hatch is located above the pickup, in such a way that it extends below the display of the card when the card is present. After the card has been inserted, the hatch is closed, thus protecting the pickup from dust and from damage by vandalism. The card holder can slide his card over the hatch until the contact pads 21 cooperate with the reader. An end-of-course switch detects the presence of the card and trips the supply of electrical power to it. An authentication of the card is then performed. It employs a secret key stored in the secret zone 11 of the nonvolatile memory 10 of the card. The reader can thus be assured that an authentic card has been inserted. This authentication procedure can advantageously be realized with the aid of an asymmetrical algorithm, which employs a public key stored in the reader and a secret key stored in the card.

If the authentication is successful, the reader opens the hatch that hides the print acquisition pickup. The hatch slides, making the pickup visible. The acquisition can then be done using the method described above. If the authentication is not successful, the terminal breaks off the communication and asks the cardholder to remove the card. There is no use in seeking to authenticate the cardholder by his print, if the card itself is not authentic.

Figure 9:
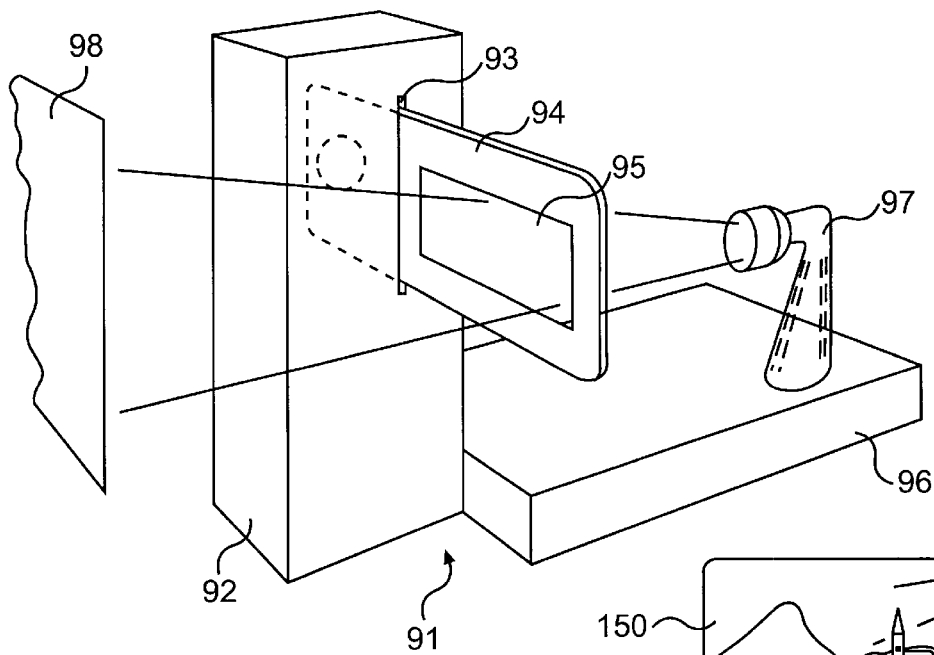
FIG. 9 shows a projector used in a method of projecting an image from the card display.

In another application of the invention, the card with the transparent display described above is capable of receiving image data originating in a remote originating device and applying them to the display, so that it can project the corresponding image onto a screen. FIG. 9 shows a projector 91 suited to this function. It looks like a slide projector, and it includes a card reader portion 92 corresponding to the data processing device 1 of FIG. 1 and has a slot 93, through which a card 94 cooperates with the reader portion by having its display 94 uncovered. The projector 91 also includes a projector portion 96, which includes a white-light source 97 located facing the display 95 of the card, so that an enlarged image of the image on the display 95 can be projected onto a screen 98. The projector portion 96 also includes optical focusing means, which are known per se and not shown.

The liquid crystal display 95 must have excellent resolution. One example is an active color matrix LCD made up of polycrystalline silicon and having 640 by 200 pixels, for a total of 128,000 pixels. Such a display has a surface area of approximately one and a half square centimeters. It is also possible to display moving images. Manufacturers are in fact proposing LCDs with a response time of 150 milliseconds and have announced that quite soon, this time will be reduced to 80 milliseconds. Such speeds enable displays with virtually motion-picture quality, with proper comfort for the viewer.

The second application of the invention is described hereinafter in a preferred use, in which the image data are protected during transmission by being enciphered. The procedure includes a first phase, in which the images are designed in an originating device located in a secure environment. These images, made in the form of digital data, are enciphered using a symmetrical or asymmetrical enciphering algorithm and an enciphering key held by the originating device. The image data may be of the "point by point" type or may be encoded using an image compression algorithm. The enciphered data are then transmitted over an unprotected line of communication, such as a radio link.

The procedure includes a second phase, in which the card deciphers the enciphered image data received from the originating device. The card, in its nonvolatile memory 10, has a deciphering algorithm, correlated with the enciphering algorithm of the originating device, and an associated deciphering key stored in the secret zone 11. The processing means of the card must be capable of linear decipherment of the data received from the originating device; they can advantageously comprise a RISC-type microprocessor, which handles 32-bit data. The deciphered image data are transmitted by the processing means 9 of the card to the display management circuit 16 so as to be displayed on the display 17; they are then projected onto the screen 98.

One such application can be used by journalists on assignment. They have a camera equipped with a CCD pickup (CCD stands for charge-coupled device) capable of converting images into digital data. The camera is also equipped with a security module, whose circuit is the same type, in terms of security, as that of the chip 15 of the card in FIG. 1, except for the display management circuit 16. The security module enciphers the data using an enciphering algorithm and key. The enciphered data are sent by radio to the editorial staff of the agency or publication the journalist works for. The card containing the corresponding deciphering key is, inserted into the projector 91, and an image deciphering program is started up. The deciphering can also be done perfectly well off-line; the enciphered data need merely be recorded using a video tape recorder. The invention makes it possible not to decipher the enciphered data until the last moment, that is, when the image is being formed on the screen 98. Since the deciphering key is only in the card, only the card is capable of deciphering the image. The confidentiality and authenticity of the image transmission are thus assured. Furthermore, the card perfectly controls the reproduction of the image. For example, the card can include a counter that authorizes reproduction of the image only a limited number of times.

Advantageously and in a manner known per se, any enciphering/deciphering session involves an exchange of risk between the originating device and the card, in such a way that the image data transmitted during one predetermined session cannot be deciphered in a different session.

This second application of the invention can also serve to display works of art, or synthetic images from a network, on a screen. For example, the projector 91 is used by a private individual to ornament a party, once the person has purchased the right to display a hundred works of art from a service provider. The person logs onto a network, such as the Internet, and inserts his card 94, which is equipped with a liquid crystal display 95. During the party, the images appear in succession on the screen 98, for example changing every two minutes, and thus allow the ornamentation of a meeting among friends. The card advantageously contains a payment or subscription means so that this service can easily be obtained through the network.

The documents transmitted confidentially can also be images, such as plans, graphics, and video images of meetings. At the outset, an originating device processes these images in digital form, either with the aid of a camera or with a graphics processing unit. The images are digitized and compressed with the aid of an algorithm and a secret key and are then sent by an arbitrary transmission means. Only the projector 91 equipped with the card containing the appropriate deciphering key can decompress and decipher the initial image and then display it. The projector 91 is used for example in a teleconference.

Figure 15:
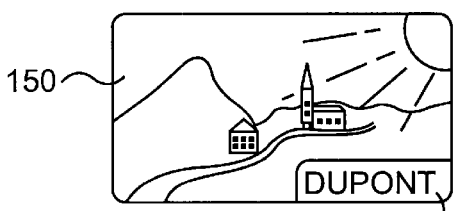
FIG. 15 shows an image that includes a visual identification.

Advantageously, and as shown in FIG. 15, the processing means in the card superimpose a "visual identifier 151" on the image 150 at the moment the image data are converted into an image. This visual identifier is a characteristic symbol of the card or its owner; it can be a number, a word spelled in letters (such as the last name and first name of the owner), a drawing, or a logo. This identifier does not vary and is always placed on the image in the same position, such as at bottom right, where television networks place their logos during broadcasts. The visual identifier 150 is a datum written in the secret zone 11 of the non-volatile memory of the card, and in principle the card holder is fundamentally unable to prevent the processing means from superimposing the visual identifier on the image.

The advantage of using such a system is to prevent copying and reproduction of the images by unauthorized persons. Regardless of how this visual identifier is used, the miniaturization of the display and its connections already makes it difficult to do such copying or reproduction. Nevertheless, the visual identifier makes doing so even more difficult for the criminal. In fact, if the criminal wants to put a photo on the screen 98, the visual identifier will appear on the photo. It will then be easy to learn the provenance of the illegally reproduced image. If the criminal also erases the visual identifier, then a zone 151 will remain in the image, forming a kind of "hole"; this hole will be proof that the image has been illegally reproduced. In a variant of this second application of the invention, the image data are transmitted to the card by the originating device in an unenciphered form, either because these data are not adjudged confidential, or that the transmission line used is secure.

Another application of the invention is to produce an image from two partial images that are completed by being superimposed, one of them for instance being displayed on a cathode ray tube screen 125 (FIG. 12) and the other on the display of a card 126, the card being pressed against the screen 125, for instance in its lower right corner, by means of a transparent pocket glued to the screen and inside which the card is slid.

To that end, a card of particular makeup is used, as FIG. 13 shows. Like that of FIG. 2, this card includes a chip 131, optionally contact pads 132, a display 133, and a strip of photovoltaic cells 134 for receiving the electrical energy optically. It also includes a strip of photoelectric cells 135 intended for receiving an electrical signal optically. In a variant the two strips of cells 134, 135 are combined into a single strip. U.S. Pat. No. 5,299,046 teaches a circuit that has photodiodes capable of receiving both the electrical energy and an electrical signal optically. In addition, in its lower right angle (FIG. 14) intended for receiving the card 126, the screen 125 has three specific emission zones 143 through 145, whose dimensions correspond respectively to those of the display 133 and the strips of cells 134 and 135. The zone 143 is arranged to be capable of displaying a partial screen image, intended to be completed by another partial card image, as described hereinafter. The zone 144 is arranged to emit a white light capable of furnishing the electrical energy to the strip of photovoltaic cells 134 on the card. Finally, the zone 145 is arranged to emit a succession of flashes of white or black light (in accordance with U.S. Pat. No. 5,299,046) which are capable of transmitting an electrical signal representing data to the strip of photoelectric cells 135 on the card.

FIG. 8a illustrates one example of a partial screen image 81, and FIG. 8b shows a partial card image 82, each comprising part of one total image 80 (FIG. 8c), which represents the number "15" in dark zones on a light background. The partial screen image 81 includes a plurality of image pieces 84, and the partial card image 82 includes a plurality of image pieces 85, which are different from and complimentary to those 84 of the partial screen image 81; it can be seen that superimposing the two partial images 81, 82 allows recovery of the total image 80. In this example, each image piece is itself a subset of points of the total image 80.

The two partial images 81, 82 can be constituted as follows. The total image, including n points or pixels $(x_i, y_i)$ forming a set $\Sigma(x_i, y_i)$, where $\Sigma$ is a symbol indicating the "sum" operation; a random drawing of p points among n is done to constitute a subset $\Sigma(x?j?, y_j)$ representing the partial screen image 81, the subset $\Sigma(x_k, y_k)$ of q remaining points, where q=n−p, representing the partial card image 82. Advantageously, the number p is close to q, such that each partial image is made up of approximately half the points n of the total image 80.

One example of using the second application of the invention, described in conjunction with FIGS. 8a–8c and 12–14, will now be described. In the context of a game broadcast live to millions of television viewers watching their own television screens 125, a broadcaster of the game being televised asks the television viewers to answer questions. One way of formulating a response to each of the questions of a set of ten questions, for example, is to select a digit from 0 to 9; the set of responses thus forms a number made up of ten specific digits. At the end of the game, the broadcaster transmits a partial screen image to each television viewer's screen by a microwave link; the image for example comprises a first, not directly legible, portion of a telephone number to call, and each potential winner has to call this number to introduce himself. The partial screen image is then displayed in zone 143 of the screen. The broadcaster also transmits partial card image data by microwave link to the zone 145 of each television viewer's screen, and these data are transmitted to each television viewer's card 126 when that card is pressed against the screen 125; these partial card image data correspond to a second portion of the aforementioned telephone number to be called, and these data are enciphered by the broadcaster using an enciphering algorithm and an enciphering key S made up of the aforementioned ten-digit number representing the response to the 10 questions.

To make them usable, these partial card image data must then be deciphered by the processing means of the card 126 owned by the television viewer, by means of a deciphering algorithm and a deciphering key equal to the enciphering key S. To that end, the enciphering key S is furnished to the card by the television viewer as follows: Either the card has a keypad for entering data (see the aforementioned EP-A 0 167 044), in which case the television viewer enters the key S from the keypad, or the card has no keypad, in which case the card is inserted into a card reader for entry of the data into the non-volatile memory of the card, when the card is pressed against the screen 125 again. After decipherment, the processing means of the card cause the partial card image corresponding to the second portion of the telephone number to be called to be displayed on the display 133; the partial screen image and the partial card image now supplement one another to form a complete image of the telephone number to be called, which is now legible to those television viewers who have answered the six questions correctly.

In a variant of the above example, the partial card image sent by a broadcaster to the card can be enciphered by means of an enciphering key, for which a corresponding deciphering key (optionally identical to the enciphering key) has been installed in the secret zone 11 (FIG. 1) of the non-volatile memory of the card by a card-issuing entity; upon decipherment by the card, the card uses its deciphering key, read from memory.

In another variant, the partial card image sent by an issuing organization or broadcaster to the card is not enciphered. The partial card image data in this case are protected, during their transmission to the card, solely by the random nature in which the total image is decomposed into a partial screen image and a partial card image.

In the case where the partial card image is compressed before being sent to the card by a compression algorithm, a corresponding decompression algorithm is advantageously stored in the secret zone 11 (FIG. 1) of the non-volatile memory of the card, in such a way as to decompress the partial card image received by the card before it is displayed on the display.

Figure 16:
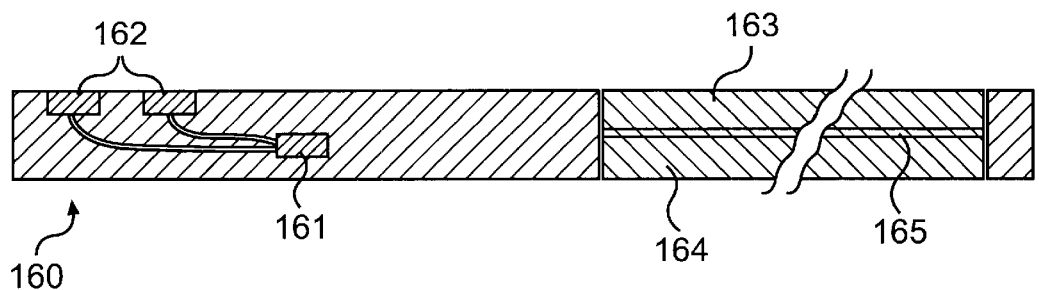
FIG. 16 is a longitudinal section through a card in another embodiment of the invention.
Figure 17:
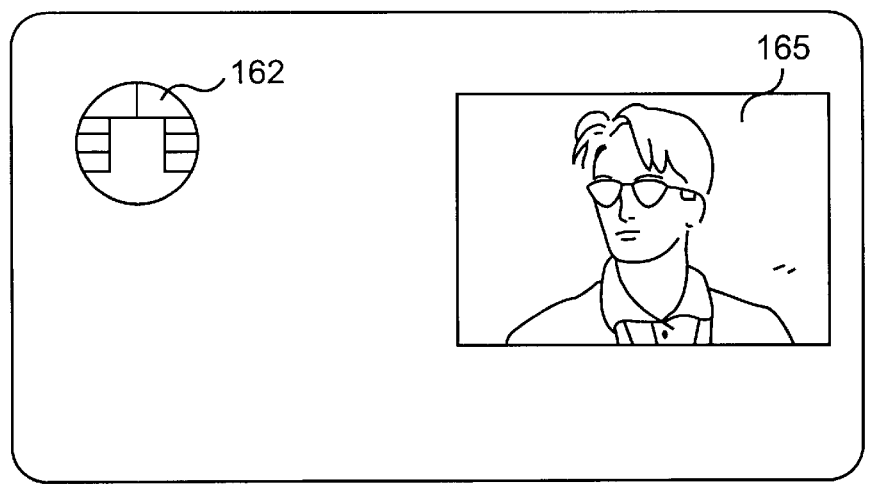
FIG. 17 is a plan view of the card of FIG. 16.

In another embodiment of the invention, shown in FIGS. 16 and 17, the chip card 160, like the card 8 in FIGS. 1–3, includes a chip 161 connected to contacts 162. The chip 161 differs from the chip 15 of FIGS. 1–3 in that it does not include any display management circuit. The card does not incorporate a display but instead has two transparent layers 163, 164, each extending through half the thickness of the card in forming a through window. The transparent layers 163, 164 are in particular of plastic material.

Placed between the two transparent layers 163, 164 is an image-carrying film 165, which extends along the entire length of the transparent layers 163, 164; it comprises a photographic slide or any suitable medium capable of being placed before a light projector for projecting an enlarged image on a screen. In this particular case, the image is a portrait of the user.

In a variant, only a single transparent layer is provided, whose thickness is equal to that of the card, and in which the image-carrying film 165 is embedded.

One typical use of the card 160 is that in which a user who is the holder of this card seeks access to a service or to premises. To that end, he inserts his card into a projector analogous to the projector 91 of FIG. 9, which is intended to cooperate with the chip 161 and therefore includes a card reader part and a projector part. The projector first verifies that the card is authentic, or in other words that it was properly issued by an authorized entity. To do so, and in a conventional authentication procedure, it sends a predetermined signal to the card, to which the card, if it is authentic, must respond with a different predetermined signal that the projector then verifies. One procedure of this type is described by ISO Standard 7816-3. If the signal returned by the card is correct, the projector asks the user to enter a user code or PIN on a keypad; it sends this code to the card so that the card will compare it with a reference user code. If the user code is declared good by the card, then an operator looks at a screen of the projector, onto which the portrait of the user is projected, and he compares the portrait with the face of the actual user before him. If they math, the operator grants access to the service or the premises as requested.

In a variant, using the portrait of the user is done in association with a message encipherment or signature procedure; to that end, the card 130 includes a secret key in the secret zone of its non-volatile memory. First, the card is inserted into a projectors that includes a card reader portion and a projector portion, and the operator makes a visual recognition of the user, using the portrait projected onto a screen. If the user's face and the portrait match, the operator authorizes the message encipherment or signature procedures, using the aforementioned secret key.

Figure 18:
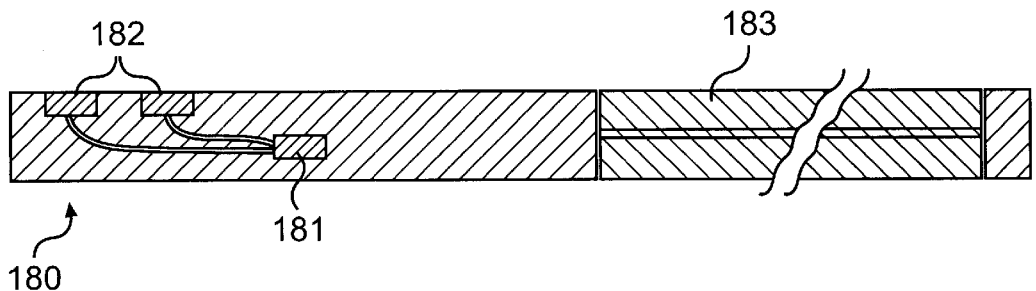
FIG. 18 is a longitudinal section through a card in still another embodiment of the invention.

In another embodiment of the invention, shown in FIG. 18, the chip card 180, like that of FIGS. 16, 17, includes a chip 181 connected to contacts 182. It differs in that this card includes a transparent layer 183 that does not include an image-carrying film; this layer accordingly does not constitute a through window. One exemplary application of this last embodiment is to use the card 180 for a fingerprint authentication procedure. The card 180 then cooperates with the card reader 40 of FIG. 4, which is equipped with a retractable hatch, in such a way that its transparent layer 183 is located facing the window for picking up the print from the reader, with the hatch placed between. The reader begins by performing an authentication of the card, as has already been described in conjunction with FIG. 4, based on a secret key stored in the secret zone of the non-volatile memory of the card. If the authentication is positive, the reader opens the hatch. The user is then asked by the reader to place his finger on the transparent layer 183 of the card, and the reader performs an acquisition of the users print through the transparent layer 183. The reader then sends the card the print data corresponding to this acquisition, and they are compared in the card with print data stored in memory and pertaining to a reference print.

Thus in a distinction from the card 8 in FIG. 3, the window of the card 180 does not act to modulate a print image by means of a display, but only to constitute a physical interface between the user's finger and the optical pickup of the reader, thus as already noted above avoiding leaving a print on the pickup and soiling it, and avoiding transmitting disease among users.

While this invention has been described in conjunction with specific embodiments thereof, it is evident that many alternatives, modifications and variations will be apparent to those skilled in the art. Accordingly, the preferred embodiments of the invention as set forth herein, are intended to be illustrative, not limiting. Various changes may be made without departing from the spirit and scope of the invention as set forth herein and defined in the claims.

What is claimed is:

1. A method for authenticating an image by comparing it with a reference image, by means of a device (40, 91, 125) and a portable object (8, 94, 126), the device including data processing means (2), data memorizing means (3,4), and image processing means (18, 97, 125), and the portable object including data processing means (9), data memorizing means (10), a through window (32, 33), and display means (17) capable of displaying an image in the window, in which the portable object is arranged to display a mask of predetermined shape in the window (32, 33), and the image processing means of the device including image sampling means (18), comprising:

placing the window of the portable object before the image sampling means of the device;

causing a mask to be displayed in the window by the display means (17) of the portable object, such that the mask masks a predetermined portion of the window;

presenting an image to be authenticated to the image sampling means in such a way that the window is placed between the image and the sampling means;

sampling by the image sampling means a datum of the image to be authenticated, linked with a portion of the image to be authenticated as said portion appears through the window, and causing said datum of the image to be authenticated to be transmitted to the portable object; and comparing said datum of the image to be authenticated by the processing means (9) of the portable object with a datum of the reference image, linked with a portion of the reference image obtained by using the same mask and stored in the memorizing means (10) of the portable object.

2. The method of claim 1, wherein said mask is randomly selected.

3. The method of claim 2, additionally comprising:

defining a plurality of masks of different shapes;

storing said plurality of masks in the portable object;

randomly selecting a mask by the portable object from the plurality of masks.

4. The method of claim 1, additionally comprising defining a plurality of masks, whose respective shapes are complementary, and successively sampling a plurality of data of the image to be authenticated, which data are obtained respectively by using a plurality of said masks.

5. The method of claim 4, wherein the image to be authenticated is defined by a predetermined number of pixels, and the mask has a surface area which is a function of this number.

6. The method of claim 1, wherein said reference image is a fingerprint.

* * * * *